United States Patent
Yen et al.

(10) Patent No.: US 8,758,887 B2
(45) Date of Patent: Jun. 24, 2014

(54) MULTILAYER POROUS MEMBRANE AND PROCESS

(75) Inventors: Larry Yen, Andover, MA (US); Rajnikant B. Patel, Tewksbury, MA (US)

(73) Assignee: Entegris, Inc., Billerica, MA (US)

(*) Notice: Subject to any disclaimer, the term of this patent is extended or adjusted under 35 U.S.C. 154(b) by 561 days.

(21) Appl. No.: 11/793,639

(22) PCT Filed: Dec. 21, 2005

(86) PCT No.: PCT/US2005/046773
§ 371 (c)(1),
(2), (4) Date: Jun. 20, 2007

(87) PCT Pub. No.: WO2006/069307
PCT Pub. Date: Jun. 29, 2006

(65) Prior Publication Data
US 2008/0020192 A1    Jan. 24, 2008

Related U.S. Application Data

(60) Provisional application No. 60/638,774, filed on Dec. 22, 2004.

(51) Int. Cl.
*B32B 7/02* (2006.01)
*B32B 27/32* (2006.01)
*B32B 3/26* (2006.01)
*C08L 23/06* (2006.01)

(52) U.S. Cl.
USPC ........ 428/212; 428/213; 428/220; 428/309.9; 428/315.7; 428/315.9; 428/516

(58) Field of Classification Search
USPC ......... 428/212–213, 220, 309.9, 315.7, 315.9
See application file for complete search history.

(56) References Cited

U.S. PATENT DOCUMENTS

| | | | |
|---|---|---|---|
| 3,953,566 A | 4/1976 | Gore | |
| 3,954,927 A | 5/1976 | Duling et al. | |
| 4,247,498 A | 1/1981 | Castro | |
| 4,588,633 A | 5/1986 | Kono et al. | |
| 4,650,730 A | 3/1987 | Lundquist et al. | |

(Continued)

FOREIGN PATENT DOCUMENTS

| | | |
|---|---|---|
| CN | 1384555 | 12/2002 |
| EP | 0811479 A2 | 12/1997 |

(Continued)

OTHER PUBLICATIONS

Australian Search Report mailed Mar. 30, 2009 for corresponding Singapore Appln. No. 200704198-1.

(Continued)

*Primary Examiner* — Prashant J Khatri
(74) *Attorney, Agent, or Firm* — Hamilton, Brook, Smith & Reynolds, P.C.

(57) ABSTRACT

A multilayer porous membrane formed of an extrudable polymer is provided. The membrane is formed by co-extruding at least two compositions, each of which comprises a heated porogen and polymer while in contact with each other under conditions to minimize or prevent unstable interfacial flow between extruded layers. In a preferred embodiment, the two compositions are different such that the layers have a different average pore size.

11 Claims, 7 Drawing Sheets

(56) References Cited

U.S. PATENT DOCUMENTS

| | | | |
|---|---|---|---|
| 4,659,470 | A | 4/1987 | Caneba |
| 4,778,601 | A | 10/1988 | Lopatin |
| 4,828,772 | A * | 5/1989 | Lopatin et al. ............... 264/45.9 |
| 4,863,604 | A | 9/1989 | Lo et al. |
| 4,863,792 | A | 9/1989 | Mrozinski |
| 4,867,881 | A | 9/1989 | Kinzer |
| 4,873,034 | A | 10/1989 | Kono |
| 4,933,081 | A | 6/1990 | Sasaki |
| 5,049,276 | A | 9/1991 | Sasaki |
| 5,064,593 | A | 11/1991 | Tamaru et al. |
| 5,120,594 | A | 6/1992 | Mroinski |
| 5,228,994 | A | 7/1993 | Tkacik et al. |
| 5,240,655 | A | 8/1993 | Troffkin et al. |
| 5,248,461 | A | 9/1993 | Pluyter et al. |
| 5,281,491 | A | 1/1994 | Rein et al. |
| 5,531,899 | A * | 7/1996 | Yen et al. ..................... 210/638 |
| 5,571,415 | A | 11/1996 | Clikeman |
| 5,658,992 | A | 8/1997 | Ehlers |
| 5,698,281 | A | 12/1997 | Bellantoni et al. |
| 5,786,396 | A | 7/1998 | Takita |
| 5,824,430 | A * | 10/1998 | Higuchi et al. ................ 429/62 |
| 5,830,554 | A | 11/1998 | Kaimai |
| 5,910,378 | A | 6/1999 | Debe et al. |
| 6,235,377 | B1 | 5/2001 | Dillon |
| 6,440,306 | B1 * | 8/2002 | Ditter et al. ............. 210/500.41 |
| 6,774,155 | B2 | 8/2004 | Martakos et al. |
| 6,881,515 | B2 | 4/2005 | Wensley |
| 2002/0001753 | A1 * | 1/2002 | Pekala et al. ................. 429/249 |
| 2002/0168564 | A1 * | 11/2002 | Wensley ....................... 429/144 |
| 2003/0149126 | A1 * | 8/2003 | Martakos et al. ............ 522/157 |
| 2003/0209485 | A1 | 11/2003 | Kools |
| 2003/0217965 | A1 | 11/2003 | Kools |
| 2004/0023017 | A1 * | 2/2004 | Nagoya et al. ............ 428/310.5 |
| 2004/0084364 | A1 | 5/2004 | Kools |
| 2007/0037047 | A1 * | 2/2007 | Ohashi et al. ................... 429/99 |

FOREIGN PATENT DOCUMENTS

| | | | | |
|---|---|---|---|---|
| EP | 0603500 | B1 | 9/1998 | |
| EP | 1047141 | A2 | 4/2000 | |
| EP | 1047141 | A2 | 10/2000 | |
| EP | 1153969 | A1 * | 11/2001 | ................ C08J 9/28 |
| EP | 1256991 | A2 | 4/2002 | |
| EP | 1256991 | A2 | 11/2002 | |
| GB | 2298817 | | 2/1996 | |
| JP | 62-254806 | | 11/1987 | |
| JP | 1-338559 | | 12/1989 | |
| JP | 1320273 | A | 12/1989 | |
| JP | 2129238 | | 5/1990 | |
| JP | 5251069 | | 9/1993 | |
| JP | 98395/1994 | | 5/1994 | |
| JP | 07-053760 | | 2/1995 | |
| JP | 07-56320 | | 3/1995 | |
| JP | 07-228718 | | 8/1995 | |
| JP | 09-087413 | | 3/1997 | |
| TW | 460510 | B | 10/2001 | |
| WO | 99/19924 | A1 | 4/1999 | |
| WO | WO 00/20493 | | 4/2000 | |

OTHER PUBLICATIONS

International Search Report from counterpart International Application No. PCT/US2005/046773, dated Jun. 14, 2006.

Written Opinion of the International Preliminary Examining Authority from counterpart International Application No. PCT/US2005/046773, dated Jun. 14, 2006.

International Preliminary Report on Patentability from counterpart International Application No. PCT/US2005/046773, dated Sep. 26, 2007.

European Search Report for EP Application No. 10178008.8-2113, dated Nov. 19, 2010.

Search Report for counterpart application ROC (Taiwain) Patent Application No. 094145726. "Multilayer Porous Membrane and Process of Manufacture", dated Jul. 3, 2012 (English translation attached).

* cited by examiner

Very Unstable Flow

MULTILAYER POROUS MEMBRANE AND PROCESS

CROSS REFERENCE TO RELATED APPLICATIONS

This application claims priority to U.S. Pat. Application Ser. No. 60/638,774 filed Dec. 22, 2004, the contents of which are incorporated herein by reference in their entirety.

FIELD OF THE INVENTION

This invention relates to a porous membrane with multiple regions or layers of differing porosity and or pore size, and to a process for forming the membrane including a thermal phase inversion step. In particular, the invention relates to a microporous membrane formed as a single, integral membrane having multiple regions or layers.

BACKGROUND OF THE INVENTION

Multilayer porous membranes from polymers that can be dissolved in a solvent at room temperature have been produced by casting processes. Typically, such membranes are asymmetric in that one layer has an average pore size different from the average pore size in a second layer. Such membranes are useful when utilizing the layer having a larger average pore size as a prefilter so that larger, retained particles are not concentrated in the layer having the smaller average pore size. When the multilayer porous membrane is utilized in this manner, the overall useful life of the membrane is extended.

Multilayer porous membranes can be formed by co-casting two or more polymer solutions at or near ambient conditions onto a support to form a multilayer liquid sheet which is then immersed in a liquid coagulation bath to effect phase separation and to form a multilayer porous membrane. Since these processes require the formation of a liquid layer, the processes are limited to polymers that can be dissolved in a solvent at normal room temperatures. These casting techniques are common in the art.

U.S. Pat. No. 4,828,772 discloses microporous membranes formed from ultrahigh molecular weight polyethylene (UHMW-PE). UHMW-PE does not dissolve in solvent at room temperature. In this process, UHMW-PE is mixed with a porogen (solvent) which is then heated to form a composition that can be caused to flow under pressure, such as the pressure exerted in a conventional extruder. The porogen has a higher boiling point than the temperature to which the UHMW-PE-porogen mixture is heated to form a flowable composition. A single layer porous membrane is produced from the heated UHMW-PE-porogen mixture by forming it (via extrusion) and cooling it. The porogen is removed from the formed UHMW-PE extrusion with a solvent that selectively dissolves the porogen, while leaving the UHMW-PE unaffected. Heretofore, this technique has only been contemplated for forming single layer porous membranes, for use alone, or in combination with one or more separate porous membranes in a composite filter.

One method for forming multilayer porous membranes is to form each layer separately and join the layers in a filtration device. This method is undesirable, in many applications, since the layers are fragile and can easily deform or fracture during handling to effect joining of the layers. It does, however, have the advantage that each layer may have a different composition from the others.

Accordingly, it would be desirable to provide a process for forming an integral multilayer porous membrane produced from an extrudable polymer, such as UHMW-PE, which does not afford itself to casting techniques. Such a process would permit the use of polymers not currently available for producing integral multilayer porous membranes.

SUMMARY OF THE INVENTION

In some embodiments, the invention provides methods for producing a multilayer microporous polymeric membrane, comprising the steps of:

forming at least two mixtures, each mixture comprising a polymer composition and a porogen composition;

separately heating each of the mixtures to an elevated temperature to produce a corresponding solution for each of said mixtures;

co-extruding each solution in contact with at least another of the solutions through a forming die under moderate shear to form a multilayer sheet, wherein adjacent layers correspond to contacted solutions;

cooling the multilayer sheet sufficiently to cause phase separation resulting in a polymer-rich, porogen-poor phase and a polymer-poor, porogen-rich phase in each layer of said multilayer sheet;

creating a microporous structure in the multilayer sheet by selectively removing the porogen composition from the multilayer sheet to yield a microporous multilayer membrane; and drying the multilayer membrane.

In some embodiments of each of the polymeric membranes described herein, each of the polymer compositions comprises a polymer selected from the group consisting of polyethylene, ultrahigh molecular weight polyethylene (UHMW-PE); polypropylene; poly (tetrafluoroethylene-co-perfluoroalkylvinyl ether) wherein alkyl is propyl, methyl or mixtures thereof, (PFA); poly(tetrafluoroethylene-co-hexafluoropropylene) (FEP); and mixtures thereof.

In some embodiments, each of the porogen compositions have a boiling point above the temperature used to form the polymer and porogen solution. In some embodiments, the composition comprises a porogen selected from the group consisting of hydrocarbons, decane and higher homologues, mixed hydrocarbons, mineral oil, mineral oil-dibutyl sebacate mixture, paraffin wax, di(2-ethylhexyl)phthalate, di(2-ethylhexyl)adipate, dibutylphathalate, dibutylsebacate, tetralin, n-decanol, 1-dodecanol, and diphenylmethane, and mixtures thereof.

In some embodiments, the porogen composition comprises a mixture of mineral oil and dibutyl sebacate. In other embodiments, the porogen includes or consists of mineral oil.

In some embodiments, each of the polymer compositions comprises ultrahigh molecular weight polyethylene (UHMW-PE); and each of said porogen compositions comprises mineral oil, dibutyl sebacate, or a mineral oil-dibutyl sebacate mixture.

In some embodiments, each polymer-porogen mixture used to form a polymer-porogen solution can comprise about 2% to about 25% polymer composition by weight of said mixture, preferably about 10% to about 20% polymer composition by weight of said mixture. In some embodiments the polymer content of mixtures producing adjacent layers differs by about 0% to about 10% by weight, in some embodiments from about 0% to about 8% by weight, and preferably by about 0% to about 3% by weight.

In some embodiments, the elevated temperatures employed during extrusion to produce a solution from each mixture, differs by about 0° C. to about 100° C. in solutions producing adjacent layers. Preferably, the elevated temperatures employed to produce a solution from each mixture, differs by about 0° C. to about 50° C. in solutions producing adjacent layers.

In some embodiments, the ratio of extrusion flow rates of solutions producing adjacent layers can be from about 10:1 to about 1:10, preferably about 4:1 to about 1:4.

In some embodiments, the method includes one or more further steps such as cooling, extraction, drying, annealing, and strengthening. In some embodiments, the membrane is cooled by bringing it into contact with a solid surface. In some further embodiments, the porogen is removed by extraction. In some embodiments, the membrane is restrained during extraction to minimize collapse of the microporous structure.

In some embodiment the invention provides methods of producing a multilayer microporous membrane having at least two layers. In some embodiments, the methods of the invention produce membranes having 3 layers, 4 layers, or more layers.

In some embodiments, the invention provides methods for producing an integral dual layer microporous polymeric membrane, comprising the steps of:

forming a first mixture comprising a polymer composition and a porogen composition, and a second mixture comprising a polymer composition and a porogen composition, wherein each mixture can be the same or different;

heating the first mixture and the second mixture, separately and independently, to an elevated temperature to produce a first solution and a second solution, respectively;

co-extruding the first solution and the second solution in contact with each other through a forming die under moderate shear to form a dual layer sheet, wherein a first layer corresponds to the first solution and a second layer corresponds to the second solution;

cooling the dual layer sheet sufficiently to cause phase separation resulting in a polymer-rich, porogen-poor phase and a polymer-poor, porogen-rich phase in each layer of said dual layer sheet;

creating a microporous structure in the dual layer sheet by selectively removing said porogen composition from the dual layer sheet to yield a dual layer microporous membrane; and drying the dual layer membrane.

The method may further comprise the steps or acts of heat setting the multilayer or multiregion porous membrane.

In some embodiments, the invention provides a multilayer microporous polymeric membrane, the membrane comprising at least two layers of co-extruded polymeric material forming an integral porous bulk matrix. In some embodiments, the polymeric material is not castable from a solvent at or near room temperature. In some embodiments, the polymeric material of each layer is independently selected from the group consisting of polyethylene, ultrahigh molecular weight polyethylene (UHMW-PE); polypropylene; poly (tetrafluoroethylene-co-perfluoroalkylvinyl ether) wherein alkyl is propyl, methyl or mixtures thereof, (PFA); poly(tetrafluoroethylene-co-hexafluoropropylene) (FEP); and mixtures thereof.

In some embodiments, at least one polymeric material is polyethylene, preferably ultrahigh molecular weight polyethylene.

In some embodiments, the invention provides multilayer microporous membranes wherein at least two layers of the membrane have different average pore size.

In some embodiments, the membrane comprises three layers, the middle layer having a smaller pore size than the layers on either side.

In some embodiments, the invention provides a multilayer porous membrane comprising an integral bulk matrix comprising two layers of co-extruded ultrahigh molecular weight polyethylene integrally joined together; wherein each layer has a different average pore size.

In some embodiments, the invention provides a multilayer porous membrane having at least two layers of porous polymeric material, resulting from co-extruding at least two heated polymer-porogen solutions, wherein said at least two layers have a different average pore size. In some embodiments the heated polymer-porogen solutions are miscible during co-extrusion and form an integral porous membrane.

In some embodiments, the invention provides a multilayer porous membrane comprising a first layer comprising a first polymeric material defining a plurality of pores of a first average pore size; and a second layer comprising a second polymeric material defining a plurality of pores of a second average pore size; wherein the first and the second layer are conjoined, by coextrusion, coextensively along their entire length and width to form an integral membrane. In some embodiments, the first and second polymeric materials are not castable from a solvent at or near room temperature. In some such embodiments, the first average pore size differs from the second average pore size.

In some embodiments, the invention provides multilayer membrane comprising one or more additional layers, integrally formed via co-extrusion with the first and the second layers; wherein adjacent layers are distinguished by different average pore sizes.

In some embodiments of the methods of the invention, each of the polymer compositions includes or consists of ultrahigh molecular weight polyethylene (UHMW-PE); and each of the porogen compositions includes or consists of mineral oil, dibutyl sebecate, or a mixture thereof.

In some embodiments, at least one layer of the membranes of the invention possess ion exchange capacity, for example by incorporation of ion exchange particles.

In a further embodiment, the invention provides a gel polymer membrane that has two or more regions of differing porosity and or pore size, wherein the gel membrane includes a phase separated porogen in the pore structure of the membrane polymer. The membrane polymer is characterized in that it is not soluble in a solvent near room temperature, but can form a solution with a solvent above room temperature. The polymers can also be characterized in that they cannot be cast into a membrane at room temperature. In some embodiments, each region of the gel polymer membrane can be essentially homogeneous, the two or more homogeneous regions having a different porosity, pore size, flux or pore structure. In some embodiments, the regions can have a gradient of porosity, pore size, or flux. In some embodiments, the regions of differing porosity and/or pore size in the gel membrane are separated by an interface. The interface can range from being well defined, to being in the form of a gradient of changing pore size, or other membrane characteristic. The different regions of the gel membrane can also be characterized in that the regions have differing porogen concentration or composition. Preferably, the different regions of the gel membrane have a thickness of greater than about 1 micron. The gel membrane, which is formed following phase separation of the porogen and polymer, can be used to make porous membranes following removal of the porogen from the membrane.

In a further embodiment, the invention provides a microporous polymer membrane that has two or more regions of differing porosity and or pore size, wherein the polymeric material of the membrane is characterized in that the polymer is not soluble in a solvent near room temperature, but can form a solution with a solvent above room temperature. The polymers also can be characterized in that they cannot be cast into a membrane at room temperature. In some embodiments, the microporous membrane does not have an essentially homogeneous (within about ±25% and preferably within about ±10% or less) porosity, pore size, flux or pore structure throughout its structure. Rather, in some such embodiments, the microporous membrane has two or more porous regions that face each other. In some embodiments, each region of the microporous polymer membrane can be essentially homogeneous, the two or more homogeneous regions having a different porosity, pore size, flux or pore structure. In other embodiments the regions can have a gradient of porosity, pore size, flux. In some embodiments, the regions of the microporous polymeric membrane can be separated by an interface, that can range from being well defined to being in the form of a gradient of changing pore size, or other membrane characteristic. Regions of differing porosity and or pore size in the polymeric microporous membrane can be characterized by differences in the appearance of their membrane structure. Preferably the regions have a thickness of greater than about 1 micron, and even more preferably greater than about 5 microns.

In a further embodiment, the invention provides methods of making a microporous polymer membrane that has two or more regions of differing porosity and or pore size. In some embodiments, the methods include coextruding two or more polymeric compositions, wherein each of the polymeric compositions comprises a polymer that does not form an extrudable polymeric composition with a solvent at room temperature. In some embodiments, the polymer forms an extrudable solution with a porogen above room temperature. In accordance with some embodiments of the methods of the invention, joint extrusion of the two or more polymeric compositions forms a polymeric sheet that can be phase separated to form a polymeric gel sheet that includes a polymer with two or more regions of differing porosity and or pore size, that contains different porogen compositions. The porogen in the different regions of the polymeric gel sheet can be removed to form a microporous polymeric membrane with two or more regions of differing porosity and or pore size. The regions of the microporous polymeric membrane can be separated by an interface. The interface can range from being well defined to being in the form of a gradient of changing pore size or other membrane characteristic. In some embodiments, the methods further include restraining the polymeric gel sheet as the porogen is removed. Regions of differing porosity and or pore size in the polymeric microporous membrane can be characterized by differences in the appearance of their membrane structure.

DETAILED DESCRIPTION

A multi-layer microporous membrane according to the invention is formed through co-extrusion of two or more polymer solutions, to form an integral membrane, defined by two or more layers or regions.

"Integral" as used herein refers to a membrane that contains 2 or more regions or layers that were formed contemporaneously and together form a single inseparable structure. In some embodiments, an integral membrane is formed via coextrusion of 2 or more polymer-porogen solutions as described herein.

"Layer" as used herein refers to a portion of the integral membrane that derives from substantially one of at least two extruded polymer compositions.

"Interface" as used herein refers a commingled area between two layers.

"Coextrusion" as used herein refers to the process of extruding two or more material compositions through a single die so that the extrudates merge together in a laminar structure before chilling.

In accordance with some embodiments, the invention provides a microporous membrane having at least two layers in an integral membrane structure. The membrane forms an integral porous bulk matrix, which is useful in filter applications. Each layer is defined independently from adjacent layers by its chemical composition, average pore size, thickness, and other properties. In some instances, the chemical composition may be identical or different.

Figure 2:
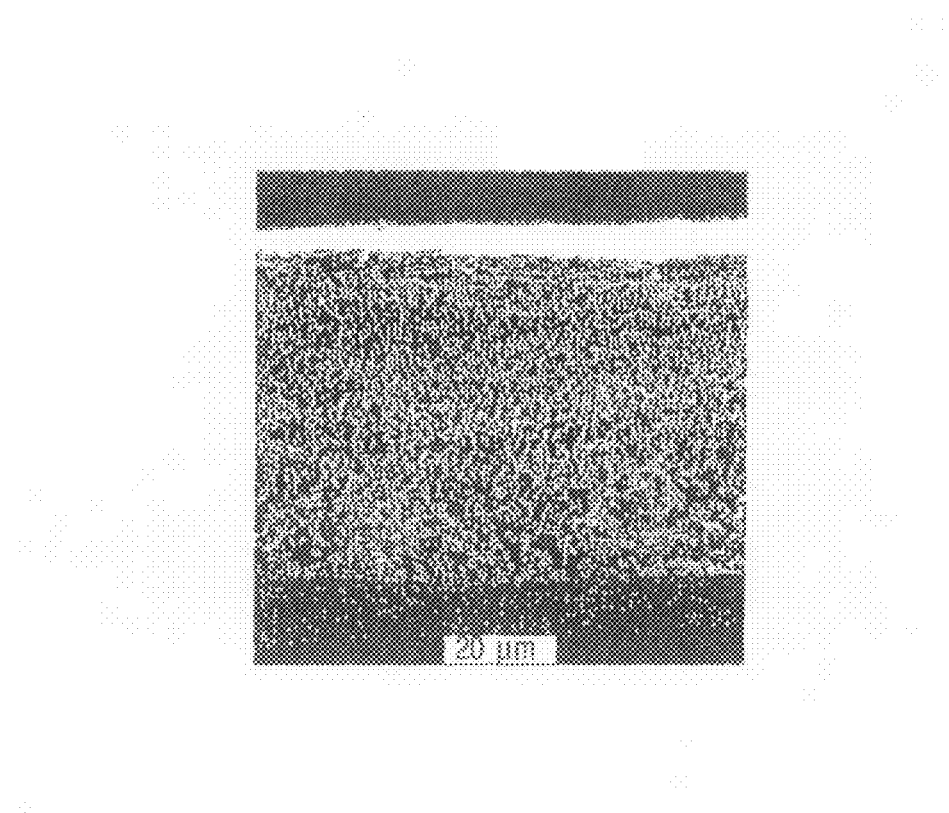
FIG. 2 is a cross-sectional photomicrograph of a UHMW-PE multilayer porous membrane according to one embodiment of this invention.

The different layers or regions of the microporous polymeric membrane can be separated by an interface whose density, pore structure, porosity, pore size, or any combination of the same can be well defined or can vary in a continuous manner across the interface. In some embodiments, continuous variation across the interface may appear like a gradient and extend for a distance within the membrane with no practical delimitation from one region to the next. In other embodiments, the variation across the interface from one region or layer to the other is more abrupt or well defined. The density, pore structure, porosity, pore size or other property used to characterize the layer or region of the membrane can refer to an average value or to a range of values taken in an area or volume of the membrane. Regions of differing porosity and or pore size in the polymeric microporous membrane can be characterized by differences in the appearance of their membrane structure. For example, FIG. 2 illustrates a membrane that is about 60 microns thick with a top region or layer whose top most 20 microns has a higher density and different pore structure (size, shape, or other features) than that found in a bottom region or layer, whose lower most 20 microns of membrane appear less dense and more open. A central region of the membrane, the middle most 20 microns, illustrates an example of an interface between the top and bottom regions of the membrane. The transition at the interface is fairly abrupt and illustrates a change in density and pore structure across the central region between the lower and top regions or layers.

Figure 7:
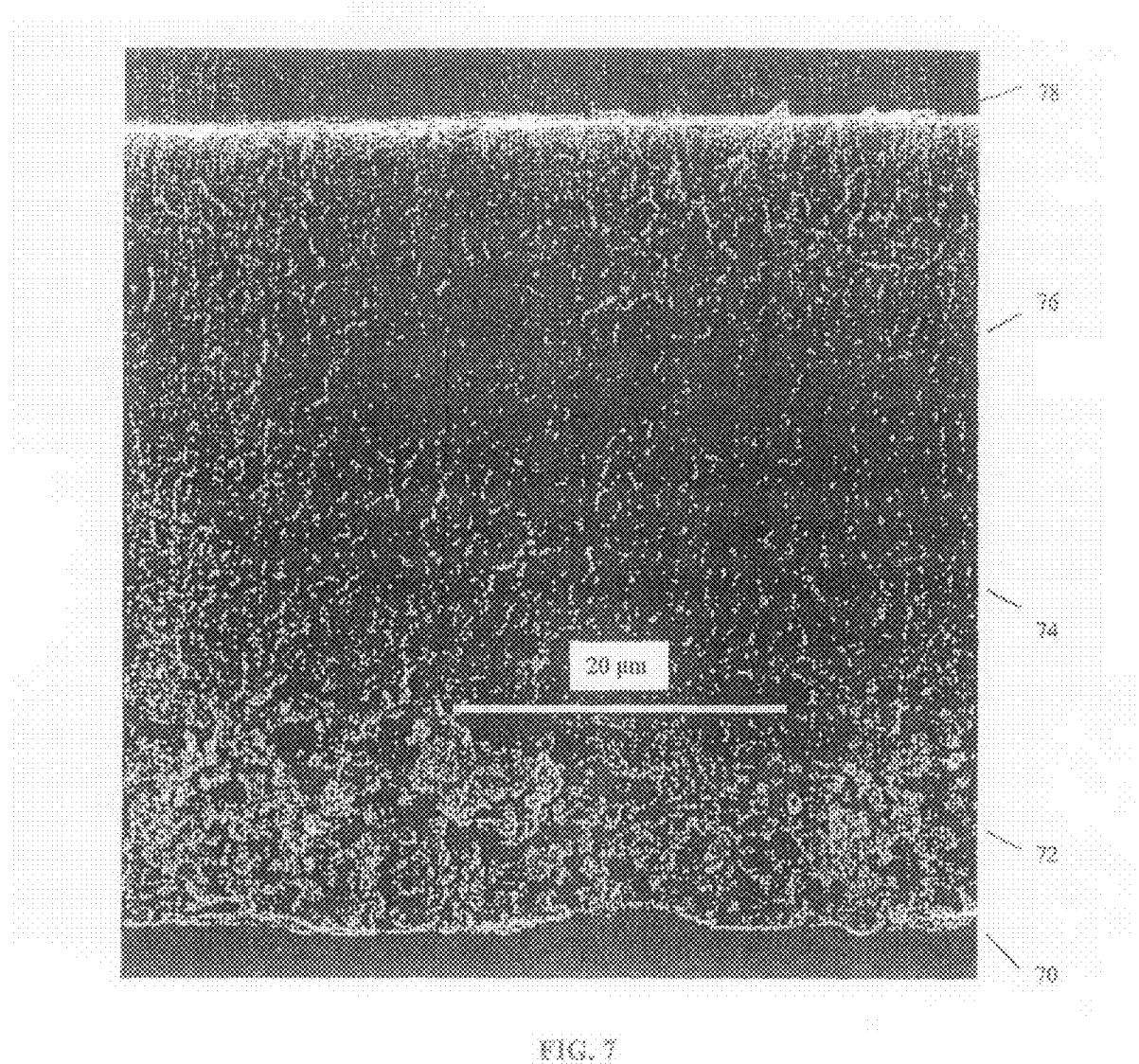
FIG. 7 is a cross-sectional photomicrograph of UHMW-PE multilayer porous membranes according to another embodiment of this invention.

In some embodiments, the interface is described by a more continuous change from one region to the other, as illustrated in the membrane shown in FIG. 7. In the cross section of the porous membrane of FIG. 7, a first porous surface 70 of the membrane overlies a relatively open porous region of the membrane 72. The open region of the membrane 72 has pores that gradually become smaller toward a center region 74 of the porous membrane and the pores become smaller still progressing to region 76. A second porous surface 78 overlies the smaller pore sized region of the membrane. The structure of this embodiment of the invention is characterized by a decrease in pore size or a gradient in pore size from the first porous surface 70 to the second porous surface 78. As can been seen in FIG. 7, each region or layer can be distinctly identified, yet remains inseparable from adjacent layers or regions.

In accordance with some embodiments of the invention, a multilayer porous membrane comprises a first layer comprising a first polymeric material defining a plurality of pores of a first average pore size, and a second layer comprising a second polymeric material defining a plurality of pores of a second average pore size, wherein the first and second layers are conjoined, by coextrusion. The coextrusion facilitates fusing the two layers coextensively along substantially their entire length and width to form an integral membrane. One or more additional layers can also be integrally formed via co-extrusion with the first and the second layers. In some preferred embodiments, adjacent layers are distinguished by different average pore sizes. Non-adjacent layers can have identical properties, including average pore size, if desired.

Polymers that can be used to form the microporous polymeric membranes in embodiments of the present invention are not soluble in solvents at room temperature. The polymers may also be characterized in that they cannot be cast into a membrane at room temperature. These polymers can be dissolved in a solvent above normal room temperatures to form extrudable solutions. As used herein, the term "room temperature" or "normal room temperature" is intended to mean a temperature of, for example, from about 18° C. to about 25° C. As used herein, the terms "elevated temperature", or "above room temperature", or "above normal room temperature" are intended to mean temperatures greater than from about 18° C. to about 25° C., for example above about 50° C., or above about 75° C. The polymeric material of each layer or region, or the combination of polymer and porogen can be selected to form an integral sheet following extrusion through a common die. In some embodiments the polymer-porogen solutions are miscible during co-extrusion and can be used to form an integral porous membrane. The polymeric material of each layer can be independently selected from the group consisting of polyethylene, ultrahigh molecular weight polyethylene (UHMW-PE); polypropylene; poly (tetrafluoroethylene-co-perfluoroalkylvinyl ether) wherein alkyl is propyl, methyl or mixtures thereof, (PFA); poly(tetrafluoroethylene-co-hexafluoropropylene) (FEP); and mixtures thereof. Other additives or specialty resins known in the art can optionally be mixed with the polymeric material. Depending on the desired layer and membrane characteristics, the polymeric materials used to form adjacent layers can be the same or different. Even where the materials are the same, each layer can be imparted with different final properties by the extrusion and membrane forming process.

Each layer of the multilayer porous membrane is formed from a heated polymer-porogen solution. Co-extrusion of the heated polymer-porogen solutions provides the multilayer porous membrane. The final layer and membrane characteristics are controlled by various extrusion parameters and choice of the polymer and porogen used. In some preferred membranes, at least two layers have a different average pore size.

In accordance with this invention, a process is provided for forming a multilayer porous membrane from a polymer which does not form a solution with a solvent at normal room temperatures. The membrane is formed from polymer compositions which differ from each other and which can be co-extruded into a multilayer or multi-region structure at elevated temperatures and under conditions to minimize layer or region thickness non-uniformity and interfacial flow instability between layers during processing. Manipulation of layer thickness uniformity and stable interfacial flow between different combined polymer/porogen solutions can be used to produce membranes useful for filtration that have increased flux, decreased pressure drop, and greater retention compared to single region or single layer membranes. In some embodiments, layer thickness uniformity and stable interfacial flow between different combined polymer/porogen solutions can be used to form uniform multilayer membranes. Layer thickness uniformity and stable interfacial flow of different combined polymer/porogen solutions can be manipulated by controlling the viscosity, temperature and extrudate output of each polymer/porogen solution, so that they form a membrane sheet with two or more inseparable regions or layers. Effective pore size of each layer is controlled by providing different polymer/porogen compositions for each layer. The layers are contacted to each other, co-extruded as one combined sheet and cooled. The porogen then is selectively extracted from each polymer composition to form the multilayer porous membrane.

In accordance with this invention, multi-layer or multi-region microporous membranes are derived from polymers that are suitable for extrusion, rather than casting. Such polymers differ from typical polymers used to create membranes, such as polysulfones, that are not suitable for extruding but are well suited for immersion casting. A multilayer porous polymeric membrane of the present invention contains polymeric material that has been extruded into at least two integrally joined layers to form an integral porous bulk matrix. Advantageously, a membrane having layers of different pore size can be constructed. Additionally, the process allows for control of the thickness of the entire membrane as well as the thickness of different regions or layers within the membrane. These and other characteristics are controlled in large part by selection of the polymer used and the parameters established during the extrusion and membrane forming process.

Two or more extrusion lines are used to produce a multi-layer membrane, in accordance with the invention. Each extrusion line is fed a mixture of a polymer composition and a porogen composition. Mixing and heating the mixture of a polymer composition and a porogen composition forms a heated polymer-porogen solution that can be caused to flow under normal pressures encountered in a conventional extruder. The polymer-porogen solutions then are co-extruded through a single die in a manner such that they contact each other coextensively for substantially their entire length and width prior to being cooled to a temperature at which the polymer and porogen phases separate. By operating in this manner, the adjacent layers are formed simultaneously and in contact with one another as an integral multilayer sheet when the layers are cooled. Extrusion parameters such as output rate, temperature, viscosity, cooling rate, etc. can be independently selected for each extrusion line based upon the desired final characteristics of the membrane, or layer thereof, and the properties of the polymer and porogen used. Cooling facilitates separation of polymer and porogen into distinct phases. The porogen is selectively removed from the sheet to produce a multilayer microporous membrane. Further treatment such as drying and strengthening can then be performed. Optionally the extruded membrane can be further treated by heat setting it to minimize shrinkage of the membrane during use or device fabrication.

Figure 1:
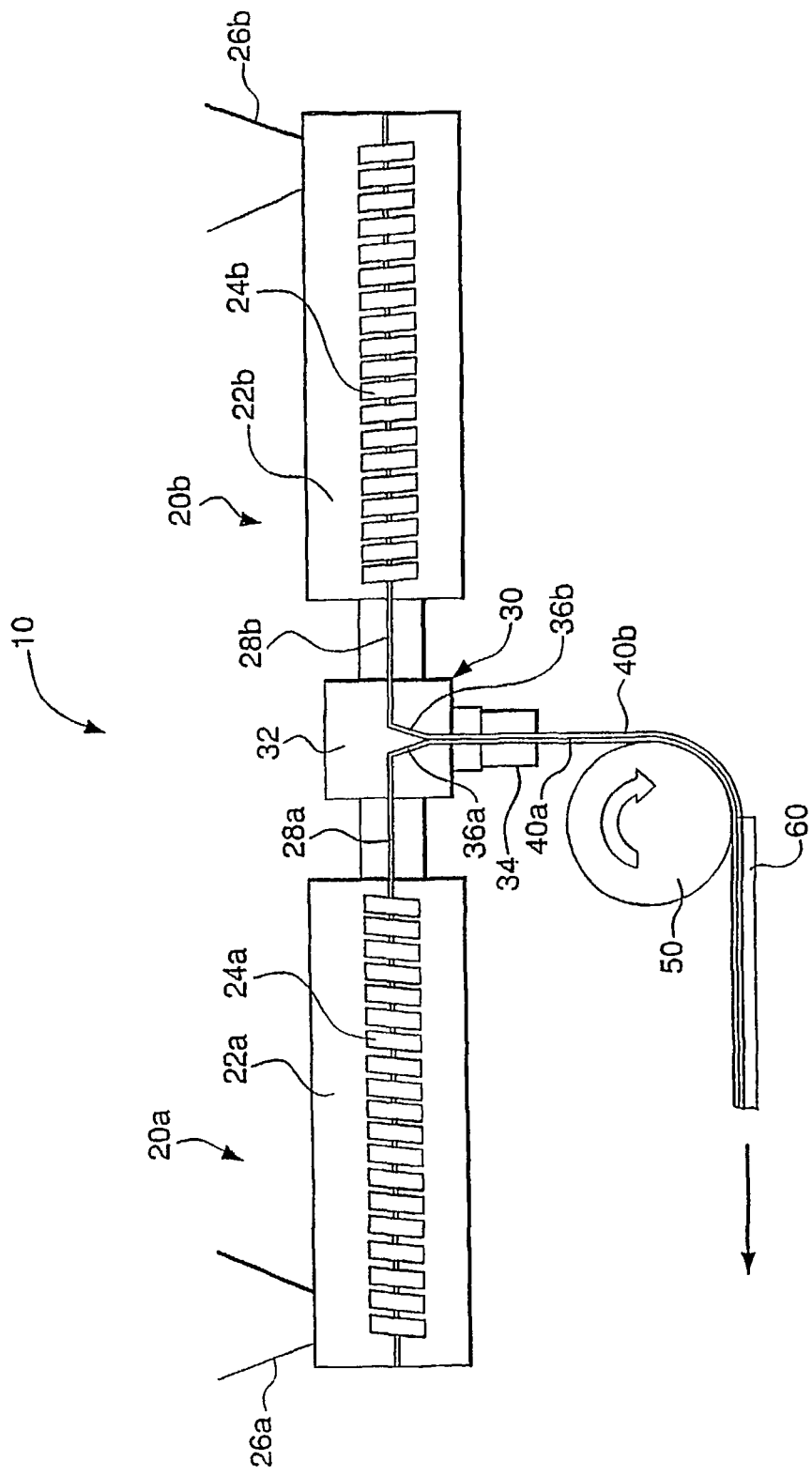
FIG. 1 is a schematic of one embodiment of an apparatus useful for conducting some embodiments of the process of this invention.

Referring to FIG. 1, a suitable extrusion and membrane forming system for use in practicing some embodiments of this invention is shown. The system 10 includes a first extruder 20a having an extruder barrel 22a with conventional twin screws 24a and feed hopper 26a. The system 10 includes a second extruder 20b having an extruder barrel 22b with conventional twin screws 24b and a feed hopper 26b. Any conventional extruder can be used. The twin-screw extruder is preferred over a single-screw extruder because of its greater mixing ability. A multi manifold die 30 including a feed block 32 and a die 34 is provided which is in fluid communication with the exits 28a and 28b of extruder 20a and extruder 20b, respectively. The feed block 32 defines two convergent paths 36a and 36b, in fluid communication between extruder exits 28a and 28b, respectively, and the die 34, through which extrudate flows. The convergent paths 36a and 36b facilitate contacting and joining of the multiple extrudates as layers 40a and 40b, without allowing free mixing to occur. Some commingling at the interface can occur. Such commingling should not be so extensive as to result in homogeneity or a new composition combining the multiple extrusion streams, but is sufficient to conjoin the adjacent layers or regions. It is this interface that differentiates an integral membrane from composite filters having two or more separate membranes which are joined by physical means such as adhesive or friction. An integral multilayer sheet 42 exits the die 34 and is cooled. FIG. 1 illustrates the integral multilayer sheet 42 contacting a chill roll 50 prior to being directed to a support 60.

A chill roll 50 is one exemplary means to cool the integral multilayer sheet 42. Other cooling means known to those of ordinary skill in the art may be used. On the chill roll 50, the layer 40a is cooled at a faster rate than the rate the layer 40b, because extrudate 40a is in direct contact with the cooling surface. Generally, due to the faster cooling rate, that the average pore size of the porous membrane layer in direct contact with the cooling surface, here the layer 40a, is smaller than the average pore size of the membrane layer not in contact with the cooling surface, here the layer 40b. Cooling allows separation of the polymer and porogen in distinct phases in each layer. The porogen can then be removed from the gel membrane. For example, the cooled multilayer sheet containing polymer rich phases and porogen rich phases can be immersed in a solvent or other extraction fluid for the porogen to selectively remove the porogen, leaving a multi-layer or multi-region porous membrane. In some embodiments, immersion in multiple solvents or mixtures of multiple solvents might be required, depending on the solubility of the porogen or porogens used in each layer.

Because the membrane can shrink during porogen removal, in some embodiments it is preferred to restrain the membrane during porogen removal. Such restraint can be employed to minimize dimensional change in the membrane as well as to minimize collapse of the microporous structure.

After porogen removal, the multilayer microporous membrane can be treated or heat set to remove any remaining extractant. This can be done at ambient temperature or by exposing the membrane to elevated temperatures. At elevated temperatures, the multilayer microporous membranes can also be strengthened. The temperature chosen can depend upon the polymeric material in the membrane and is below the melting point of the polymer, in some embodiments, temperatures of up to about 125° C. have been found to be suitable. Strengthening or annealing processes are well-known in the art and can optionally be employed either contemporaneously with the drying step or as a separate step. Those of skill in the art will readily recognize suitable strengthening or annealing processes.

It is also preferred to restrain the membrane during drying to minimize dimensional changes and/or collapse of the microporous structure.

Figure 6:
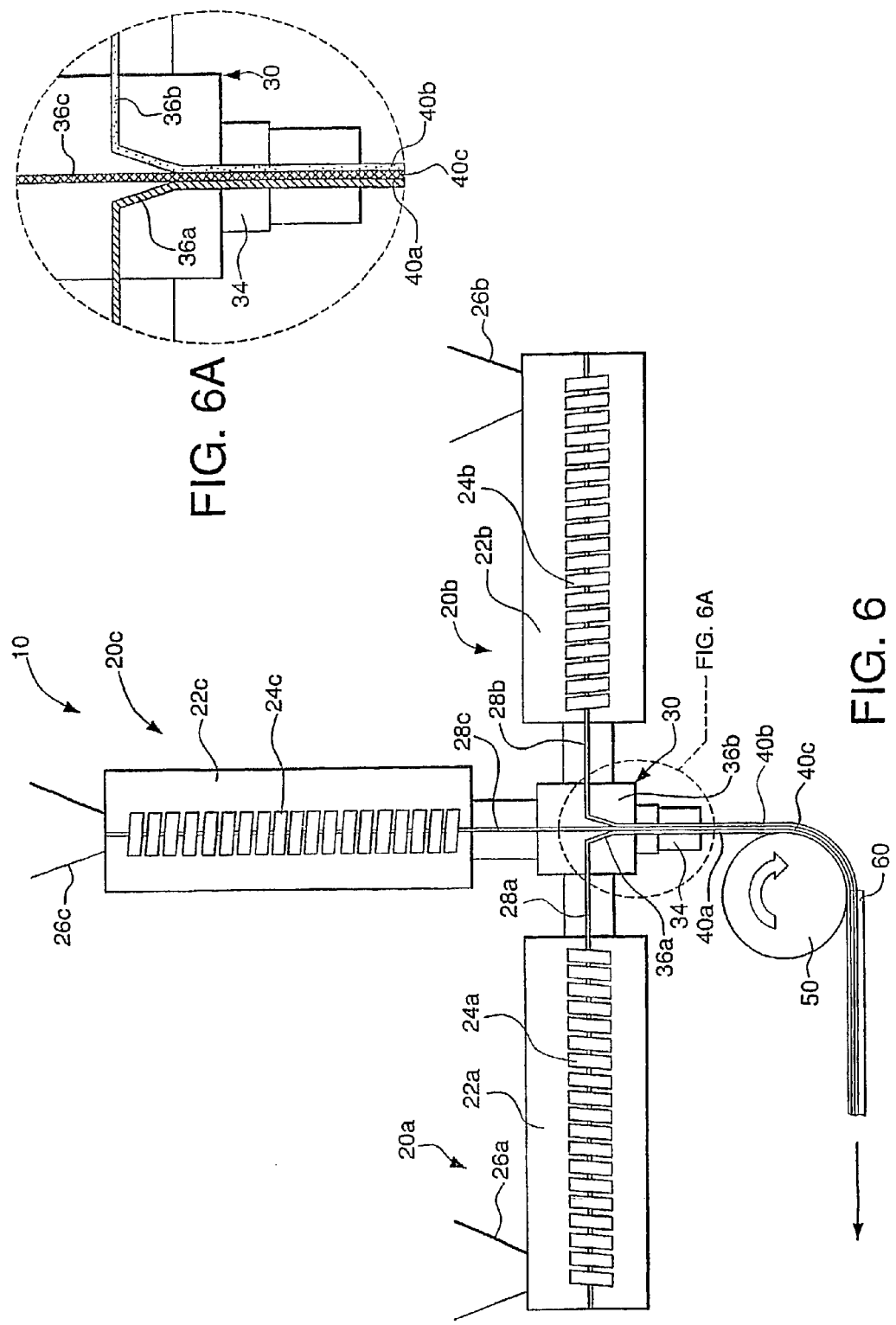
FIG. 6 is a schematic of one embodiment of an apparatus, employing three extrusion lines, useful for conducting some embodiments of the process of this invention.

The system illustrated in FIG. 1 has two extrusion lines to make a two-layer or multi-region membrane. Additional extrusion lines can be added for additional layers or regions. In such systems, the feedblock will have multiple inputs, one for each extrusion line, and multiple paths for conjoining the multiple layers prior to exiting the single extrusion die as a single sheet. FIG. 6 illustrates a three line system. Parts of the third extruder and flows are identified by a "c" following the reference numeral used to identify a similar part in the first two extruders of FIG. 1. For example, the extrusion barrel in each case is designated 22, followed by either a, b, or c depending on which extruder being referred to. A magnified inset view is provided to show the three extrudates within the feedblock and as they exit the die.

Those of skill in the art of extrusion and extrusion die fabrication will recognize that the feedblock can be designed to allow for multiple flows from a single extruder. Thus, with a two extruder set up, it is possible to direct two flows, for example, from one extruder, and through feedblock design, direct those flows to sandwich a single flow from a second extruder. In this manner, a three layer membrane having outer layers of identical composition can be made from two extruders. Thus, although each layer can be derived from just one polymer-porogen solution, and thus one extruder, each extruder is not limited to production of just one layer.

The choice of polymer and porogen can be used to modify the properties of each layer or region of the membrane. Such properties may include but are not limited to the pore size, porosity, chemical compatibility, lyophobic or lyophillic properties of each region or layer. When selecting polymer and porogen combinations in adjacent layers, it should be kept in mind that differences in the final properties of each layer also can be manipulated by utilizing different porogen and/or polymer compositions for each layer. The choice of polymer and porogen in each layer can affect properties such as average pore size, viscosity, cooling rate, etc. Each of these in turn affects the layer and membrane properties.

Representative suitable polymer compositions include, but are not limited to, ultrahigh molecular weight polyethylene (UHMW-PE), polypropylene, poly (tetrafluoroethylene-co-perfluoroalkylvinyl ether) wherein alkyl is propyl, methyl or mixtures thereof, (PFA), poly(tetrafluoroethylene-co-hexafluoropropylene) (FEP) and mixtures thereof.

Traditionally, UHMW-PE is differentiated from other polyethylenes, such as high density polyethylene (HDPE) and low-density polyethylene (LDPE), because it displays no measurable flow rate under normal test procedures, see U.S. Pat. No. 3,954,927. Additionally, it is generally accepted that polyethylenes with a weight average molecular weight of 1 million and higher are included within the class designated as UHMW-PE. Such molecular weights correspond to an intrinsic viscosity in the range of about 8 or more. See Schwartz, S. S, and Goodman, S. H., Plastics Materials and Processes, Van Nostrand Reinhold Co., New York, N.Y. pp. 74-77 (1982). ASTM D4020-01a sets forth a "Standard Specification for Ultra-High-Molecular-Weight Polyethylene Molding and Extrusion Materials." Under the standard, linear polymers of ethylene having a relative viscosity of 1.44 or greater, in accordance with the tests set forth in the standard, are defined as ultra-high-molecular-weight polyethylenes (UHMW-PE).

Use of polyethylenes meeting the traditional standards or the ASTM standard are contemplated for use herein as UHMW-PEs. UHMW-PE is desirable because it has significantly enhanced mechanical properties compared to other polyethylenes. These enhanced mechanical properties include abrasion resistance, impact resistance and toughness. UHMW-PE is readily available commercially.

UHMW-PE is marketed as a white powder by several suppliers. Ticona, for example, markets an UHMW-PE powder under the trademark GUR and Mitsui Petrochemical markets UHMW-PE powder under the trademark HI-ZEX MILLION.

Polymers other than UHMW-PE can be added to the mixture of UHMW-PE and porogen on an optional basis. An example of an additive polymer is HDPE with weight average molecular weight less than 1 million. Additionally, specialty resins employed for to produce specific effect may also be introduced into the mixture. Such specialty resins include, but are not limited to ion exchange resins, including those describe in U.S. Pat. No. 5,531,899, incorporated herein by reference in its entirety. As a general rule, the type and amount of such additional polymers should be limited so as not to detract significantly from the advantageous mechanical properties obtained by forming membranes from UHMW-PE.

Suitable ion exchange resins comprise anion or cation exchange resins having a particle size of 50 microns or less, preferably between about 10 and about 20 microns. Ion exchange resin particles of this size can be obtained by grinding commercially available resin beads which generally have an average particle size of about 150 to 300 microns. Representative suitable ion exchange resins include sulfonated styrene-divinylbenzene copolymer, phosphonated styrene-divinylbenzene copolymer and carboxylated styrene-divinylbenzene copolymer. Suitable anion exchange resins include tertiary and quartenary amine functionalized styrene-divinylbenzene copolymer. A particularly preferred cation exchange resin comprises a diphosphonic acid-modified styrene based copolymer matrix. It has been found that this polymer should have a degree of swelling of less than about 300% and preferably less than about a 250% It has been found that copolymers of this composition having a degree of swelling of more than about 300% excessively when contacted with water which results in a reduction of permeability of the membrane when the particles are present in a concentration suitable for acceptable ion exchange capacity. Particular ion exchange resin compositions which are suitable in the membranes of this invention include: a copolymer comprising (a) a first polymerizable component selected from the group consisting of vinylidene diphosphonic acid and alkyl/aryl esters of said diphosphonic acid; (b) a second polymerizable component selected from the group consisting of an acrylamide and styrene; (c) a third polymerizable component of a monomer selected from the group consisting of acrylonitrile, methyl acrylate and methyl methacrylate; and (d) a fourth polymerizable component of a copolymer selected from the group consisting of a divinylic and a trivinylic cross linking agent; a copolymer comprising (a) a first polymerizable component selected from the group consisting of vinylidene diphosphonic acid and alkyl/aryl esters thereof of from about 5-95 weight percent; (b) a second polymerizable component consisting essentially of styrene from about 1-95 weight percent; (c) a third polymerizable component selected from the group consisting essentially of acrylonitrile of about 10-95 weight percent; and (d) a fourth polymerizable component selected from the group consisting of divinylbenzene of about 5-50 weight percent and 2-ethylhexanol; or a copolymer comprising (a) a first polymerizable component selected from the group consisting of vinylidene diphosphonic acid and alkyl/aryl esters of said diphosphonic acid; (b) a second polymerizable component of an acrylamide; and (c) a third polymerizable component consisting essentially of acrylonitrile.

Suitable ion exchange capacity is obtained with the membrane of this invention when a concentration of resin particles between about 50 and about 95 weight percent, preferably between about 85 and about 91 weight percent. When the resin particles are present at this concentration, the ion exchange capacity of the resulting membrane is at least about 9 $\mu$mole/cm$^2$. Furthermore, the ion capture efficiency should be at least about 95%, preferably at least about 98%.

Although the UHMW-PE is preferred, other polymers, or combinations thereof may be used with success. These polymers are well-known in the art and readily available from several commercial sources.

The term porogen is employed herein to mean a material which can be mixed with a polymer such as UHMW-PE, and heated to an elevated temperature to form a solution of porogen and polymer which can be extruded and subsequently is cooled to create distinct phases rich in porogen, that can be removed selectively from the cooled extrudate to create a microporous polymeric structure. The porogen can form a solution with the polymer on the macroscopic scale. Porogens which leave residual undissolved fractions which can be seen only on a microscopic level are suitable. Preferably, the porogen is a hydrocarbon. Hydrocarbons exhibit relatively good solvency at elevated temperatures for the polymers utilized in the present invention such as olefin polymers. Aliphatic, alicyclic and aromatic hydrocarbons, and mixtures thereof can be employed as porogens.

Solvents that are liquid and which boil at temperatures greater than the temperature used to produce the polymer-porogen solution can be used as porogens. Hydrocarbons which are liquid and which boil at temperatures greater than the temperature required to produce the polymer-porogen solution are preferred. Either pure hydrocarbons, such as decane and higher homologues, or mixed hydrocarbons of the type normally found in petroleum fractions, such as kerosene, fuel oil and the like can be used. Mineral oil or a mineral oil-dibutyl sebacate mixture are particularly preferred porogen compositions.

Hydrocarbons which are solids at ambient temperatures, such as paraffin wax, can also be used as porogens if they meet the criterion of being a liquid solvent for the polymer at elevated temperatures.

Other organic compounds which can be used as porogens, particularly with UHMW-PE, are di(2-ethylehexyl)phthalate, di(2-ethylehexyl)adipate, dibutylphathalate, dibutylsebacate, tetralin, n-decanol, 1-dodecanol, and diphenylmethane, mixtures thereof and the like.

When the porogen is a liquid at room temperature, a dispersion or slurry can be formed for introduction in to the extruder by adding the polymer composition, e.g., UHMW-PE powder, into the liquid and mixing the two. On the other hand, if the porogen is a solid at room temperature, a powder mix can be formed by dry-mixing finely ground solid porogen with UHMW-PE powder. Regardless, a mixture of polymer composition and porogen composition is fed to the extruder for melting, dissolution, further mixing, and extrusion.

Figure 5:
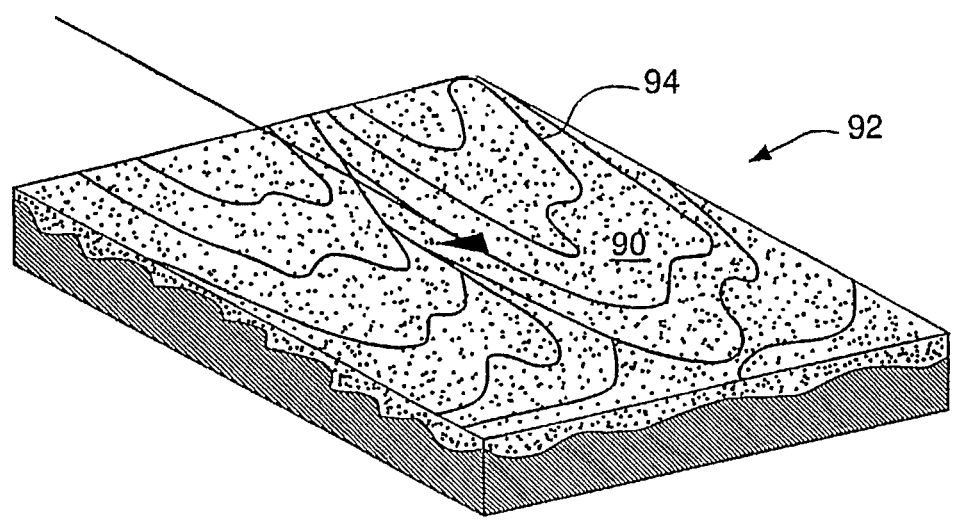
FIG. 5 is a top view illustrating the outer surface of a multilayer porous membrane not made in accordance with this invention.

Unstable interfacial flow between adjacent extruded layers is preferably minimized or prevented. Otherwise, the exposed surface of the multilayer membrane is characterized by waves, evidencing non-uniform thickness of the membrane product, as illustrated in FIG. 5. These waves can be formed for several reasons, such as excessive differences between the flow rate or viscosity of one polymer-porogen solutions and the flow rate or viscosity of a second polymer-porogen solution, for example. These waves and non-uniform thickness are undesirable where they result in non-uniform filtration and or flow characteristics, for example a variation in such properties of greater than about ±25%, across the membrane surface. Co-extrusion through a single die ensures the layers are co-extensive across their width and along their length so that desired uniform filtration characteristics are obtained. Manipulation of these and various other extrusion parameters results in the desired layer and final membrane properties.

Embodiments of the microporous membrane having two or more layers or regions can have a thickness that can range from about 20 microns to about 70 microns, preferably from about 30 microns to about 60 microns. The overall thickness can be chosen to provide sufficient membrane strength, pressure drop, or flux for use. The thickness of the individual layers or regions can vary. In some embodiments of the microporous membrane having two or more layers or regions, individual layers or regions of the membrane can have a thickness that is about 50 percent or less of the total membrane thickness, in some cases the individual regions have a thickness that is about 20 percent or less of the total membrane thickness, preferably 10 percent or less of the total membrane thickness. For example, a 50 micron thick multi-region microporous membrane can have a region with large pores that is about 45 microns thick integral or inseparable from a region with smaller pores that is about 5 microns thick.

The polymer porogen solutions are formulated to provide a viscosity for making multilayer or multiregion microporous membranes. The porogen-polymer solutions are miscible during co-extrusion. The solutions can be formulated for example to have sufficient melt strength for processing, to have good interfacial flow, to form a sheet of the polymers from the die that is inseparable, that can be extruded, or any combination of these. The viscosity of each polymer/porogen solution is controlled, at least in part, by controlling the weight percent polymer based on the total weight of polymer composition and porogen composition as well as temperature of the solution. Generally, the difference in weight % polymer used to make adjacent layers should be maintained between about 0 weight % and about 10 weight %, in some embodiments from about 0% to about 8% by weight, and preferably between 0 weight % and about 3 weight %. In addition, to controlling the differential, controlling the weight % polymer in each layer also affects the layer's properties and the workability of the membrane. Different solvents or a mixture of solvents in the porogen-polymer solutions can be used to achieve a 0 weight % difference.

The weight percent of the polymer in the solution with the porogen can be chosen to provide solutions that have sufficient melt strength and that have a viscosity that can be processed. For example, it has been found that mixtures containing more than about 25% polymer, e.g., UHMW-PE, by weight based on the weight of the mixture produce solutions which are difficult to process at practical rates because of their high viscosities. On the other hand, mixtures containing below about 2% polymer, e.g., UHMW-PE, by weight, produce solutions having melt strengths so low that processing of the extruded membrane is difficult. In addition, mixtures containing below about 2% polymer, e.g., UHMW-PE by weight, result in microporous membranes in which much of the microporous structure collapses. Collapse of the microporous structure results in a decrease of the permeability of the membranes. Accordingly, between about 2% and about 25% by weight of the polymer porogen composition can be polymer by weight. However other weight percentages outside of this range could be used for other polymers besides UHMW-PE as could be determined by one skilled in the art. Amounts of polymer, e.g., UHMW-PE, between about 10% and about 20%, by weight based on the weight of the mixture, are preferred because such amounts result in extruded membranes which can be readily processed with conventional equipment to produce microporous membranes having outstanding properties. The viscosities of the two or more polymer porogen solutions extruded by the die can preferably be within about +10%.

Temperature differential during extrusion of adjacent layers can be maintained between about 0° C. and about 100° C., preferably between about 0° C. and about 50° C. Output (flow rate) ratio of adjacent layers can be maintained between 10:1 to 1:10, preferably between 4:1 to 1:4. Maintaining these properties within acceptable ranges between adjacent layers facilitates uniform membrane thickness and stabilizes interfacial flow between adjacent layers. This allows conjoining of adjacent layers without extensive commingling or undesirable surface effects. Maintaining these properties within acceptable ranges between adjacent polymer porogen solutions in the die also facilitates bonding between different regions or layers of the membrane.

These same properties, useful in controlling and maintaining uniform membrane thickness and stable interfacial flow, are also useful in controlling the parameters in the layers of the final membrane and the overall characteristics of the membrane as a whole. For example, the choice of porogen can be used to modify the type, structure, or morphology of the pores formed. Mineral oil is a porogen known to produce lacy open pores. Other factors such as cooling also play a role. When a single chill roll is used, only one of the multiple layers will contact the cooling surface. This layer is cooled at a quicker rate than the remaining layers. This will affect the size of the pores in the final product. All other things being equal, the layer in contact with the cooling surface would have smaller pores than an adjacent layer extruded under identical circumstances, which does not contact the cooling surface. Of course, this outcome can be altered through manipulation of the other properties. Similarly, two membranes made under identical extrusion conditions, but cooled at different temperatures can result in markedly different final membrane properties. Comparing Examples 2 and 3 below, demonstrates this point, showing the noticeable differences between two final membranes where the only difference is the cooling temperature (see the Table below).

Each mixture of polymer composition and porogen composition is fed to an extruder where it is heated, to an elevated temperature to form a polymer-porogen solution. The exact temperature required to dissolve the polymer will depend upon the type or composition of the polymer, the molecular weight of the polymer, the porogen, and the concentration of polymer present. In general, temperatures of about 200° C. or more have been found suitable, however for other polymers, temperatures that are higher or lower which are suitable for making embodiments of the present membranes can be used and determined by one skilled in the art.

Solution forming is done in the extruder under moderate shear. It has been found that some shear is necessary to provide sufficient mixing for uniform heat distribution across the polymer and to allow more mixing and interpenetration of the components during processing of each extruder. The appropriate amount of shear is an amount sufficient to form, in the extrusion apparatus, a homogeneous solution of polymer in porogen so that membranes can be extruded which do not contain defects, such as holes and bubbles and which have good strength. However, the amount of shear should be below an amount which significantly degrades the mechanical properties of polymer. The amount of shear desired is referred to herein as "moderate" shear.

The amount of shear to which the solution being extruded is subjected can be controlled as follows. The shear rate applied to the solution is a function of the design of the extrusion system. In particular, the screw speed and the gap between the screw and barrel wall of the extruder contribute to the shear rate. If more than one screw is employed in the extruder, such as in twin-screw extruders, the shear rate is also affected by the distance between the screws, the design of the screws and their rotational relationship, i.e., co-rotating or counter-rotating. Thus, the shear rate can be adjusted by appropriate selection or modification of these extruder parameters. In addition, the amount of polymer degradation due to shear can be lessened by reducing the residence time of the polymer mixture and solution in the extruder. For example, the barrel of the extruder can be shortened to reduce the residence time for polymer mixture and solution.

Each polymer solution is extruded through separate extruders and the extrudates exiting from the extruders are fed together through a multi-input manifold feedblock and then forced within and through a common die in contact with each other so as to join the layers having a co-extensive width and length.

The extrudate from each extruder then is passed through a common feedblock/film die combination or through a multi-manifold film die wherein they are contacted and joined together under pressure to form a multilayer sheet. The resultant sheet is cooled to a temperature sufficient to cause phase separation in the multilayer membrane sheet or gel sheet. Such cooling results in a polymer-rich, porogen-poor phase and a distinct polymer-poor, porogen-rich phase within the membrane.

Cooling is carried out at or below the phase separation temperature. Typically, temperatures of below about 100° C. have been employed, however other temperatures higher or lower may be used depending upon the particular polymer(s) used and pore size desired. A particularly suitable cooling apparatus comprises a motorized rotating chill roll.

The cooling rate of the extruded multilayer membrane can also affect the ultimate multilayer membrane structure produced. In general, slower cooling rates tend to provide larger pores in the microporous membranes and increased gas and liquid permeability. The length of time the extruded membrane is maintained under cooling conditions also affects the ultimate structure and properties of the microporous membrane produced.

After sufficient cooling to create two phases, in each layer, a microporous structure in the multilayer membrane is created by removing porogen. A preferred way to remove the porogen is by selective extraction. Extraction can be achieved by immersing the multilayer membrane in a bath of suitable extractant liquid which is miscible with the porogen or porogen mixture and which does not appreciably affect the polymer, e.g., UHMW-PE, such as trans 1,2 dichloroethylene or hexane.

The effective pore size of the multilayer membrane is a function of the polymer/porogen compositions of the layers used and the cooling rate applied to the multilayer extrudate. Smaller sized pores are produced from compositions having a higher weight percent polymer for a given porogen or porogen mixture and/or which are cooled at higher rates. Pore sizes for the multilayer or multi-region microporous membranes of the present invention can be described as having a mean IPA bubble point (ASTM F316-80 incorporated herein by reference in its entirety) of about 10 psi or greater, in some embodiments an IPA equivalent bubble point of about 100 psi or greater, and in other embodiments an IPA equivalent bubble point of about 140 psi or greater.

The experimental work described herein indicates that the specific porogen employed can have a significant effect on the morphology and properties of the ultimate microporous membrane produced. For example, it has been found that use of the porogen, mineral oil or dibutyl sebacate, tends to result in a lacy open-type structure in the multilayer microporous membrane produced. This is desirable for liquid and gas permeability.

Referring to FIG. 5, the surface 90 of membrane 92 includes undesirable waves or ripples 94 which result from relative movement of adjacent polymer layers while the layers are in contact during processing. Such membranes are undesirable The following example illustrates the present invention and is not intended to limit the same.

EXAMPLE 1

Materials

Ultra-high molecular weight polyethylene (UHMW-PE) (240SU, Mitsui Chemical)
Mineral oil (MO) (Britol 35 USP, Witco Corp.)
Dibutyl sebacate (DBS) (A0167-R, BrandNu Lab)
Halogenated hydrocarbon solvent mixture (AccuFlush II, MicroCare Corp.)
Membrane Preparation:

A double-layer microporous UHMW-PE membrane was prepared by co-extruding two UHMW-PE solution streams (1 and 2) of different formulations simultaneously from two separate twin-screw extrusion lines. The two extrusion lines were connected by an extrusion feed block and flat sheet die such that the two solution layers are combined as one before being extruded and quenched.

Solution Stream 1

A slurry mixture consisting of 14 wt. % UHMW-PE powder, 21.5 wt. % DBS and 64.5 wt. % MO was prepared at room temperature. This mixture was stirred and metered via a FMI pump (Fluid Metering, model V200) into a twin-screw compounding extruder (Brabender, model D6/2) equipped with a pair of counter-rotating screw (L/D=7/1). A Zenith gear pump (Parker Hannifin model Pep II, 1.8 cc/rev.) and static mixer (Dynisco, 2.5 cm. diameter×23 cm. length) were also attached downstream of the extruder to form the first extrusion line. UHMWPE resin was melted and solvated in the DBS/MO solvent mixture inside this extrusion line. The temperature of the various zones of this extrusion line were set at between 220-270° C. The extruder screw speed used was 50 rpm and the gear pump speed was 4 rpm. This solution stream was fed into a 2 port co-extrusion feedblock the front layer.

Solution Stream 2

A slurry mixture consisting of 15 wt. % UHMW-PE powder, 72.3 wt. % DBS and 12.7 wt. % MO was prepared at room temperature. This mixture was stirred and metered via a FMI pump (Fluid Metering, model V100) into a twin-screw compounding extruder (Baker-Perkins, model MPC/V-30, L/D=13). A Zenith gear pump (Parkin Hannifin, model HPB, 1.2 cc/rev.) was also attached downstream of the extruder to form the second extrusion line. UHMWPE resin was melted and solvated in the DBS/MO solvent mixture inside this extrusion line. The temperature of the various zones of this extrusion line were set at between 200-260 C. The extruder screw speed used was 200 rpm and the gear pump speed was 40 rpm. This solution stream was fed into a 2 port co-extrusion feedblock as the back layer.

The two solution streams from above were joined through a co-extrusion feedblock with two input ports as a two-layer solution structure. This two layered structure was then extruded through a flat sheet die with an opening of 18 cm in width and 0.05 cm in gap thickness as a single layer solution sheet. The die temperature was maintained at 175° C. This extruded sheet was quenched on a rotating chrome plated chill roll whose temperature was controlled by re-circulating constant temperature fluid at 60° C. The front layer (solution stream 1) of the two layered film was in direct contact with the chill roll surface during this operation. Quenched gel film (thickness ~75μ) was rolled up by a motorized film winder.

To extract the DBS and MO from the quenched film which is translucent in appearance, a length of the film was mounted and clamped between two open center rectangular metal frames, and placed in an excess amount of a halogenated hydrocarbon solvent mixture (AccuFlush II) for 16 hrs. The solvent mixture was changed to fresh amount once during this extraction time. After drying the still restrained sample at room temperature, it turned white in appearance. The restrained film was then placed in an oven whose temperature was set at 125° C. for 15 mins. to further heat-set the membrane before testing.

Figure 3:
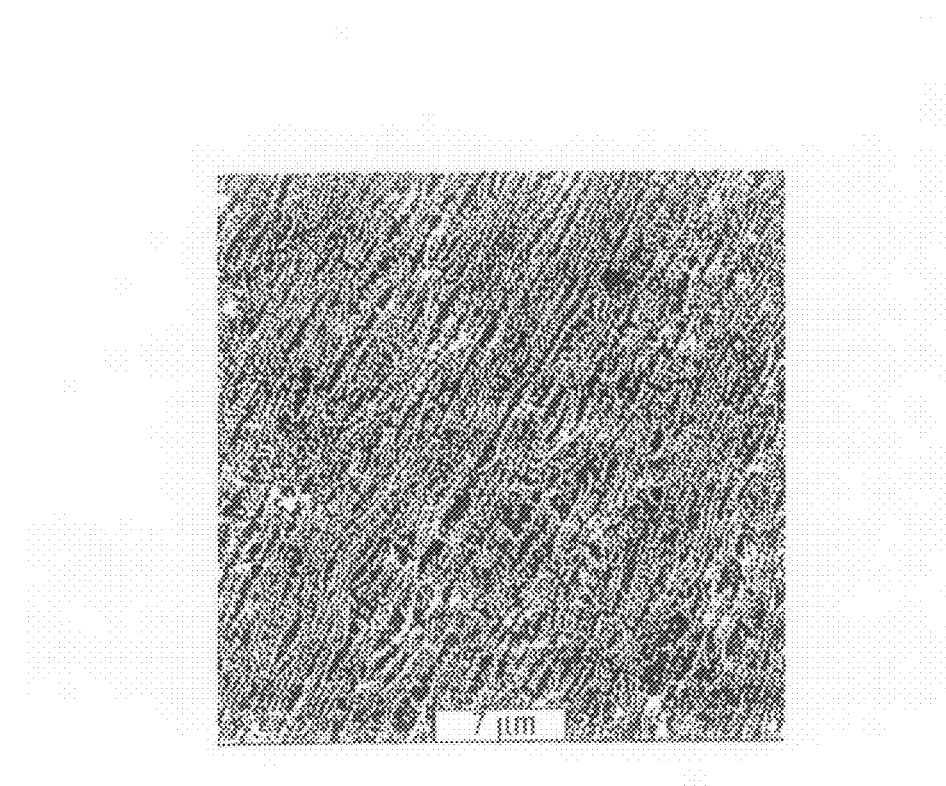
FIG. 3 is a photomicrograph of the top surface of the membrane of FIG. 2.
Figure 4:
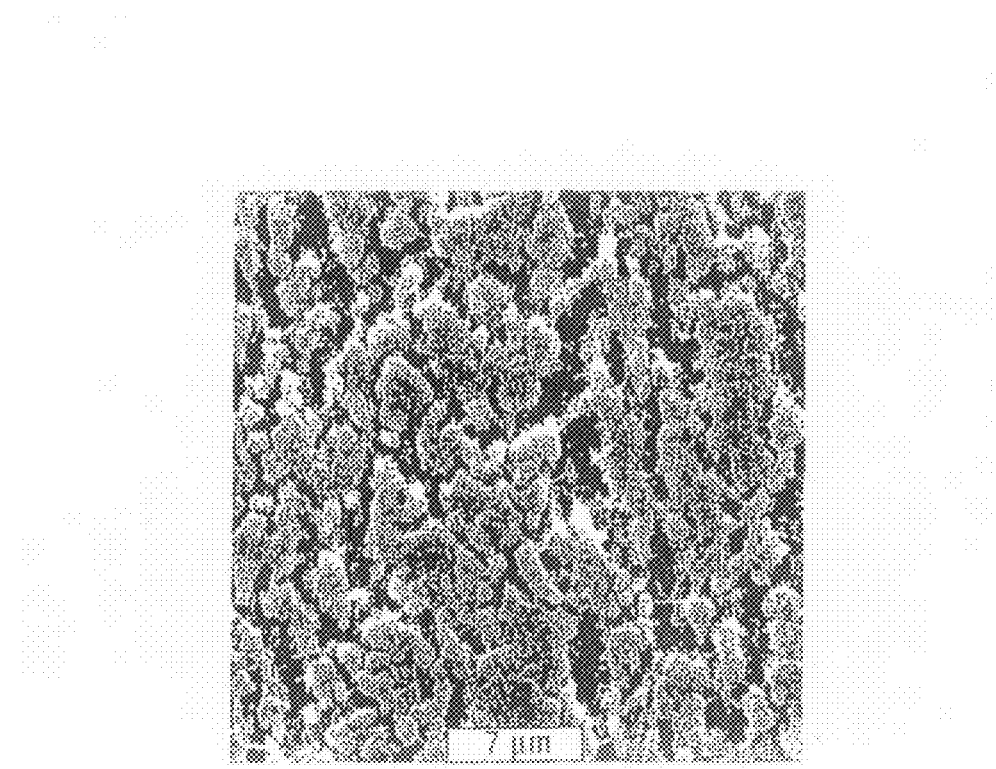
FIG. 4 is a photomicrograph of the bottom surface of the membrane of FIG. 2.

Membrane Characterizations:

The membrane sample was examined by scanning electron microscopy. The cross-section and surface images are shown FIGS. 2, 3 and 4. The cross-section view revealed an integral double layer structure with the top portion created from solution stream 1 and bottom portion created from solution stream 2. The multilayer porous membrane had the structure shown in FIGS. 2, 3 and 4. As shown in FIG. 3, the top layer is less porous than the bottom layer.

The resultant membrane was tested under standard conditions, known in the art. The isopropyl alcohol (IPA) flow rate and mean bubble point of this membrane sample were measured and given in the Table below. They are also compared to the properties of a commercial UHMW-PE membrane (TPVP manufactured by Mykrolis Corp. Microgard Plus CWAV01, 0.1μ Rated)).

The data show the UHMW-PE membrane from Example 1 has higher bubble point and flow rate than the commercial membrane (Comparative Example 1) of similar thickness.

EXAMPLE 2

A double layer UHMW-PE membranes were prepared by the co-extrusion method as described in Example 1 except for the following differences:

Solution Stream 1

Slurry mixture used consists of 17 wt. % UHMW-PE powder, 41.5 wt. % DBS and 41.5 wt. % MO. Gear pump speed used was 8 rpm Solution Stream 2

Slurry mixture used consists of 15 wt. % UHMW-PE powder, 72.2 wt. % DBS and 12.8 wt. % MO. Gear pump speed used was 40 rpm.

The chill roll temperature used for quenching the co-extruded structure was at 50 C. The properties of this membrane are given in Table 2

EXAMPLE 3

A double layer UHMW-PE membrane was prepared as in Example 2 except the chill roll temperature used for quenching the co-extruded structure was at 31 C. The properties of this membrane are given in the Table below.

TABLE

| Membrane | Thickness (μ) | Mean IPA Bubble Point* (psi) | IPA Flow Rate** (ml/min/cm²) |
|---|---|---|---|
| Example 1 | 66 | 46 | 4.1 |
| Comparative Example 1 | 60 | 43 | 3.1 |
| Example 2 | 46 | 64 | 2.0 |
| Example 3 | 44 | 82 | 1.2 |

*by air-flow porosimetry method (ASTM method F316-80)
**at 21° C. and 14 psi Δp

All references, including, but not limited to, patents, patent publications, articles, books, texts, and other references cited herein are hereby incorporated by reference.

What is claimed is:

1. A multilayer microporous polymeric membrane, comprising:
    a first layer comprising ultra-high molecular weight polyethylene (UHMW-PE) defining a plurality of pores of a first average pore size;
    a second layer comprising UHMW-PE defining a plurality of pores of a second average pore size that differs from the first average pore size; and
    an interface separating the first and second layers,
    wherein the first and second layers and the interface form an integral porous bulk matrix having an open lacy pore structure.

2. The multilayer membrane of claim 1, wherein the membrane is formed via co-extrusion of the first and second layers.

3. The multilayer membrane of claim 1, wherein the interface has a pore size gradient.

4. The multilayer membrane of claim 1, wherein the multilayer microporous polymeric membrane has two layers.

5. The multilayer microporous polymeric membrane of claim 1, wherein the membrane has a thickness of from about 20 to about 70 microns.

6. The multilayer microporous polymeric membrane of claim 5, wherein one of the first and second layers has a thickness of about 50 percent or less of the thickness of the membrane.

7. The multilayer microporous polymeric membrane of claim 1, that has an wherein the membrane has a mean isopropyl alcohol (IPA) bubble point of about 100 psi or greater.

8. A gel polymer membrane comprising:
    a first layer comprising a first phase-separated ultrahigh molecular weight polyethylene (UHMW-PE) porogen composition;
    a second layer comprising a second phase-separated UHMW-PE porogen composition that differs from the first UHMW-PE porogen composition and is miscible with the first UHMW-PE porogen composition during co-extrusion; and
    an interface separating the first and second layers,
    wherein each of the first layer and the second layer has a polymer-rich, porogen-poor phase and a polymer-poor, porogen-rich phase.

9. The gel polymer membrane of claim 8, wherein each of the first and second UHMW-PE porogen compositions comprises UHMW-PE and mineral oil.

10. The gel polymer membrane of claim 8, wherein each of the first and second UHMW-PE porogen compositions comprises between about 2% and about 25% by weight of UHMW-PE.

11. The gel polymer membrane of claim 8, wherein the porogen in each of the first and second UHMW-PE porogen compositions comprises a mixture of mineral oil and dibutyl sebacate.

* * * * *

UNITED STATES PATENT AND TRADEMARK OFFICE
CERTIFICATE OF CORRECTION

| | | |
|---|---|---|
| PATENT NO. | : 8,758,887 B2 | Page 1 of 1 |
| APPLICATION NO. | : 11/793639 | |
| DATED | : June 24, 2014 | |
| INVENTOR(S) | : Yen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this
Twenty-sixth Day of January, 2016

Michelle K. Lee
*Director of the United States Patent and Trademark Office*